(12) United States Patent
Eckl (10) Patent No.: US 9,128,612 B2
(45) Date of Patent: Sep. 8, 2015

(54) CONTINUOUS DETERMINATION OF A PERSPECTIVE

(75) Inventor: Roland Eckl, München (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 655 days.

(21) Appl. No.: 13/390,954

(22) PCT Filed: Jul. 27, 2010

(86) PCT No.: PCT/EP2010/060896
§ 371 (c)(1),
(2), (4) Date: Feb. 17, 2012

(87) PCT Pub. No.: WO2011/020683
PCT Pub. Date: Feb. 24, 2011

(65) Prior Publication Data
US 2012/0146896 A1    Jun. 14, 2012

(30) Foreign Application Priority Data
Aug. 19, 2009   (DE) .......................... 10 2009 038 095

(51) Int. Cl.
G06F 3/0488   (2013.01)
G06F 3/0481   (2013.01)
G06T 1/00     (2006.01)

(52) U.S. Cl.
CPC ........ *G06F 3/04886* (2013.01); *G06F 3/04815* (2013.01); *G06T 1/00* (2013.01)

(58) Field of Classification Search
CPC ........................ G06F 3/0312; G06F 3/04815
USPC .................................................. 345/156–184
See application file for complete search history.

(56) References Cited

U.S. PATENT DOCUMENTS

| | | | |
|---|---|---|---|
| 5,019,809 A | 5/1991 | Chen | 340/815.31 |
| 5,388,990 A * | 2/1995 | Beckman | 434/38 |
| 5,751,927 A | 5/1998 | Wason | 395/119 |
| 6,346,938 B1 * | 2/2002 | Chan et al. | 345/419 |
| 7,564,377 B2 | 7/2009 | Kimchi et al. | 340/995.13 |
| 2004/0080716 A1 * | 4/2004 | Anderson et al. | 353/31 |
| 2006/0103650 A1 * | 5/2006 | Kamiwada et al. | 345/427 |
| 2006/0132675 A1 * | 6/2006 | Choi | 349/76 |

(Continued)

FOREIGN PATENT DOCUMENTS

| | | | | |
|---|---|---|---|---|
| CN | 101427104 A | 5/2009 | | G01C 21/32 |
| EP | 1363246 A1 | 11/2003 | | G06T 17/40 |

(Continued)

OTHER PUBLICATIONS

Chinese Office Action, Application No. 201080036544.3, 10 pages, May 22, 2013.
Internatinal PCT Search Report and Written Opinion, PCT/EP2010/060896.

*Primary Examiner* — William Boddie
*Assistant Examiner* — Carolyn R Edwards
(74) *Attorney, Agent, or Firm* — Slayden Grubert Beard PLLC (57) ABSTRACT

In a method and operating element for establishing an angle of view for an observer with respect to a two or three-dimensional object, which is displayed on an output device, the establishment of the angle of view takes place by control on a simple circular disc. A point on the disc is converted to a position on a virtual sphere. The respective angle of view with respect to the object is established by the axis, determined by the calculated position on the virtual sphere and the sphere center.

23 Claims, 9 Drawing Sheets

(56) References Cited

U.S. PATENT DOCUMENTS

2007/0282792 A1 12/2007 Bailly et al. .................. 707/2
2010/0134428 A1* 6/2010 Oh ............................. 345/173

FOREIGN PATENT DOCUMENTS

WO   2005/003986 A1   1/2005   .............. G06F 15/02
WO   2008/005505 A2   1/2008

* cited by examiner

CONTINUOUS DETERMINATION OF A PERSPECTIVE

CROSS-REFERENCE TO RELATED APPLICATIONS

This application is a U.S. National Stage Application of International Application No. PCT/EP2010/060896 filed Jul. 27, 2010, which designates the United States of America, and claims priority to DE Patent Application No. 10 2009 038 095.7 filed Aug. 19, 2009. The contents of which are hereby incorporated by reference in their entirety.

TECHNICAL FIELD

The invention relates to a method for establishing an angle of view for an observer with respect to an object or for aligning an object by establishing its position for observation by an observer. The invention also relates to operating devices for carrying out the method.

BACKGROUND

Technical drawing and display programs (CAD, AutoDesk, JT2Go Viewer, etc.), special applications (3D computer tomography etc.) and also simple 3D viewers for private or at least not purely commercial usage (Google Earth, Microsoft Virtual Earth, etc.) offer the possibility of displaying individual objects or objects made up of several parts or even complete environments (manufacturing plants, virtual worlds) in 3D and of observing them from different perspectives.

The most common method for establishing the angle of view on an object is direct manipulation on the actual object. Hereby, as a rule the computer mouse cursor is clicked on the object, wherein movement in the horizontal and/or vertical direction rotates the object relative to its center point for as long as the mouse button is pressed. Depending upon the mouse buttons used, it is frequently also possible to move the object or zoom it in or out. Thereby, as a rule, the center point of the object, which, when setting the perspectives, serves as a reference point for the direction of view, is not varied.

Virtually all common programs with 3D functionality for the observation of objects operate in accordance with this principle. In some cases, certain tilting movements, rotations and other short movement sequences are also possible by selection from a context menu or available in the form of pictograms, which are displayed permanently on the concrete or abstract object at the relevant places or as soon as the mouse cursor dwells on the relevant places of the concrete object.

The patent application US 2007/0282792A1 discloses a system and method for storing, accessing and displaying location-based information (geo-located content) in a 3D model.

It is also known how to select predefined views via a context menu. These can be explicitly defined in advance or specified by the course of the X, Y and Z axes (for example, in the form of "front", "rear", "left", "top", "east", "north-west", etc). Predefined views of this kind are generally directly activated and do not provide the observer result with a smooth sequence of the view.

In the case of two-dimensional views, generally in the form of maps, with known computer-assisted approaches, the mouse is used to "grip" an arbitrary point and the whole area is moved with the movement of the mouse. Hereby, larger changes of view require frequent "regripping". Alternatively, here there is also frequently a possibility for selecting approximately fixed geographical points from a pre-defined list and activating them.

SUMMARY

According to various embodiments, a method and operating elements can be provided for the continuous determination of a perspective or an angle of view relative to a three-dimensional fixed point.

According to one embodiment, in a method for establishing an angle of view for an observer with respect to an object, in particular a three-dimensional object, a) an angle of view is established for the observer by mechanical-tactile or indirect input on a circular, substantially level, input field, wherein a point of the circular input field, defined by the input, is converted to a positioning point on a virtual sphere, wherein the center points of the virtual sphere and of the object substantially correspond and wherein the connecting line from the center point of the virtual sphere to the positioning point on the sphere establishes the angle of view for the observer, wherein the mechanical-tactile or indirect input from the input field is determined continuously and, on entering a transition region of the input field located around the edge of the circle, the positioning point automatically migrates to the rear part of the virtual sphere and b) the object is displayed with respect to the established angle of view on an output mechanism.

According to a further embodiment, a circle outline can be applied to the input field. According to a further embodiment, a circle center point can be applied to the input field. According to a further embodiment, the transition region can be applied in color or tactile form to the input field. According to a further embodiment, the conversion of a position on the input field can be performed on the positioning point of the virtual sphere by cone surface projection or azimuthal projection. According to a further embodiment, the circular input field may surround the actual object or lies between the observer and object. According to a further embodiment, the angle of view may be restricted to sections of the object. According to a further embodiment, the input field can be convex or concave. According to a further embodiment, the direction of view and/or starting point of the observer may be movable by a fixed relative value.

According to another embodiment, an operating element may be provided for carrying out a method as described above.

According to a further embodiment of the operating element, the object can be displayed relative to the established angle of view on an output mechanism. According to a further embodiment of the operating element, the operating element can be displayed on the output mechanism. According to a further embodiment of the operating element, the operating element may be embodied as a separate input element.

According to yet another embodiment, a method for aligning an object by establishing its position in the three-dimensional space, may comprise: a) establishment of an axis of the object; b) establishment of the position by mechanical-tactile or indirect input on a circular, substantially level, input field, wherein a point of the circular input field, defined by the input is converted into a positioning point on a virtual sphere, wherein the center points of the virtual sphere and of the object substantially correspond and wherein the object according to the established axis so that the connecting line from the center point of the virtual sphere to the positioning point on the sphere and the established axis correspond, wherein the mechanical-tactile or indirect input from the input field is determined continuously and, on entering a transition region of the input field located around the edge of the circle, the positioning point automatically migrates to the rear part of the virtual sphere.

According to a further embodiment of the method for aligning, the method may comprise: c) displaying the object relative to the view resulting from the change of location. According to a further embodiment of the method for aligning, the object is a physical object, additionally comprising: d) rotating the object relative to the calculated change of location.

According to yet another embodiment, a method for moving a view may comprise: a) establishment of the position by mechanical-tactile or indirect input on a circular, substantially level, input field, wherein a point of the circular input field defined by the input is converted into a positioning point on a virtual sphere, wherein the view is moved in the direction and distance of the calculated change of position of the point on the surface of the virtual sphere, wherein the mechanical-tactile or indirect input from the input field is determined continuously and on entering a transition region of the input field located around the edge of the circle, the positioning point automatically migrates to the rear part the virtual sphere.

According to a further embodiment of the method for moving a view, the view may corresponds to a map or another two-dimensional area. According to a further embodiment of the method for moving a view the view corresponds to the position of a camera in a plane.

According to a further embodiment of the method for aligning or moving a view, a circle outline can be applied to the input field. According to a further embodiment of the method for aligning or moving a view, a circle center point can be applied to the input field. According to a further embodiment of the method for aligning or moving a view, the transition region may be applied in color or tactile form on the input field. According to a further embodiment of the method for aligning or moving a view, the input field may be convex or concave.

According to yet another embodiment, an operating element may be provided for carrying out any of the above methods for aligning or moving a view.

DETAILED DESCRIPTION

The object is achieved by a method for establishing an angle of view for an observer with respect to an object, in particular a three-dimensional object, comprising the following steps:
   a) establishment of an angle of view for the observer by mechanical-tactile or indirect input on a circular, substantially level, input field,
   wherein a point of the circular input field defined by the input is converted into a positioning point on a virtual sphere,
   wherein the center points of the virtual sphere and of the object substantially correspond and
   wherein the connecting line from the center point of the virtual sphere to the positioning point on the sphere establishes the angle of view for the observer,
   wherein the mechanical-tactile or indirect input from the input field is determined continuously and on entering a transition region of the input field located around the edge of the circle, the positioning point automatically migrates to the rear part of the virtual sphere and
   b) displaying the object relative to the established angle of view on an output mechanism. This enables fluid changes to the angle of view with respect to an object (e.g. globe or any other object) without any restriction due to the edge of the screen of an output mechanism. The method is advantageously suitable for views of three-dimensional objects, but can also be used with two-dimensional objects (e.g. maps). The input can be performed in a mechanical-tactile manner by direct contact with the input field (e.g. touchscreen or touchpad) or also indirectly e.g. by mouse movements.

The object is also achieved by a method for aligning an object by establishing its position in the three-dimensional space, comprising the following steps:
   a) establishment of an axis of the object;
   b) establishment of the position by mechanical-tactile or indirect input on a circular, substantially level, input field,
   wherein a point of the circular input field defined by the input is converted into a positioning point on a virtual sphere,
   wherein the center points of the virtual sphere and of the object substantially correspond and wherein the object is rotated according to the established axis so that the connecting line from the center point of the virtual sphere to the positioning point on the sphere and the established axis correspond, wherein the mechanical-tactile or indirect input from the input field is determined continuously and on entering a transition region of the input field located around the edge of the circle, the positioning point automatically migrates to the rear part of the virtual sphere. With this embodiment, the angle of view with respect to the object does not change, but the object continuously changes its spatial position according to the input of an observer (user). With this embodiment, the input can also be performed in a mechanical-tactile manner by directly touching the input field (e.g. touchscreen or touchpad) but also indirectly e.g. by mouse movements by a user.

A first embodiment consists in the fact that that a circle outline is applied to the input field. This makes it easy for an operator to recognize that he is approaching the transition region on the input field or is already located therein. The circle outline can be embodied in color as line or as a tactile element (elevation, groove etc.).

A further embodiment consists in the fact that that a circle center point is applied on the input field. The circle center point can be embodied in color as a point or as a tactile element (elevation, recess). This assists an operator with orientation on the input field.

A further embodiment consists in the fact that that the transition region is applied in color or tactile form on the input field. Once again, this assists an operator with orientation on the input field. The width of the transition region is in principle freely optional. Advantageously, the width of the transition region is selected so that it not too small (so that, with simple movements, the change of sides change is not missed) but also not too large (change of sides, although the user only wanted to go to the edge and then return to the same side). Therefore, the size is generally determined by whether the input is performed in a mechanical-tactile manner or indirectly, but also in dependence on the size of the input device.

A further embodiment consists in the fact that that the conversion of a position on the input field to the positioning point of the virtual sphere is performed by cone surface projection or azimuthal projection. Projections of this kind can be implemented by standard programs on standard hardware (e.g. PC, laptop).

Similarly, distortions of the projections (gnomonic projections) can be used to convert distances to the circle center point equidistantly or approximately equidistantly.

A further embodiment consists in the fact that that the circular input field surrounds the actual object or lies between the observer and the object. This enables usage on, for example, a touch-sensitive table, e.g. a Surface™ table. An operator sees the object directly behind a substantially transparent input field (the input field can, for example, be clearly visible and nevertheless be transparent enough to enable an object located behind to be seen).

A further embodiment consists in the fact that that the angle of view is restricted to sections of the object. In principle, it is possible to select only sections of a sphere. These can be simple sections of the sphere with surface areas, but also more complex, mathematically calculable structures. This enables the restriction of the available angle of view with respect to the object, possibly only the front side of an object or only a top view with a certain minimum height, etc.

A further embodiment consists in the fact that the input field is convex or concave. This assists the orientation of the user without his having to look away from the screen. This embodiment also assists the user in finding the center point on the input field.

A further embodiment consists in the fact that that the direction of view and/or starting point of the observer can be moved by a fixed relative value. This increases the flexibility of the user when choosing perspectives and directions of view.

A further embodiment, in particular for aligning an object, consists in displaying the object relative to the view resulting from the change of location. This enables the object to be rotated into the view desired by the user.

A further embodiment, in particular for aligning a physical object, consists in rotating the object relative to the calculated change of location. This in particular supports a continuous rotation of the object.

According to further embodiments, substantially for the observation of two-dimensional objects, a method for moving a view may comprise the following steps:

a) establishment of the position by mechanical-tactile or indirect input on a circular, substantially level, input field, wherein a point of the circular input field defined by the input is converted into a positioning point on a virtual sphere, wherein the view is moved in the direction and distance of the calculated change of position of the point on the surface of the virtual sphere, wherein the mechanical-tactile or indirect input from the input field is determined continuously and, on entering a transition region of the input field located around the edge of the circle, the positioning point automatically migrates to the rear part of the virtual sphere. This also enables fluid changes of the angle of view with respect to a two-dimensional object (e.g. map) without any limitation by the edge of screen of an output mechanism.

An embodiment consists in the fact that that the view corresponds to a map or another two-dimensional area. This enables an observer to "traverse" all types of two-dimensional areas continuously perspectively.

A further embodiment consists in the fact that that the view corresponds to the position of a camera in a plane. This enables a user to adopt a virtual position (camera position) on the plane (area) and from there to "traverse" the plane.

According to further embodiments, operating elements may be provided for carrying out the method according to the various embodiments. Hereby, the operating element can be displayed or integrated on an output unit (e.g. monitor, display) and operated by a user directly in a mechanical-tactile manner (e.g. on a touchscreen or touchpad) or indirectly e.g. by mouse input. However, the operating element can also be embodied separately from the output unit and operated by a user in particular in a mechanical-tactile manner. A separate operating element can be embodied level, but also convex or concave and have markings for the center point, the circle outline or the transition regions. Advantageously, these markings are embodied as tactile for a user (e.g. by elevations or recesses). This alleviates the user's work without his having to look away from the screen. An exemplary embodiment is shown in the drawing and is described below.

Figure 1:
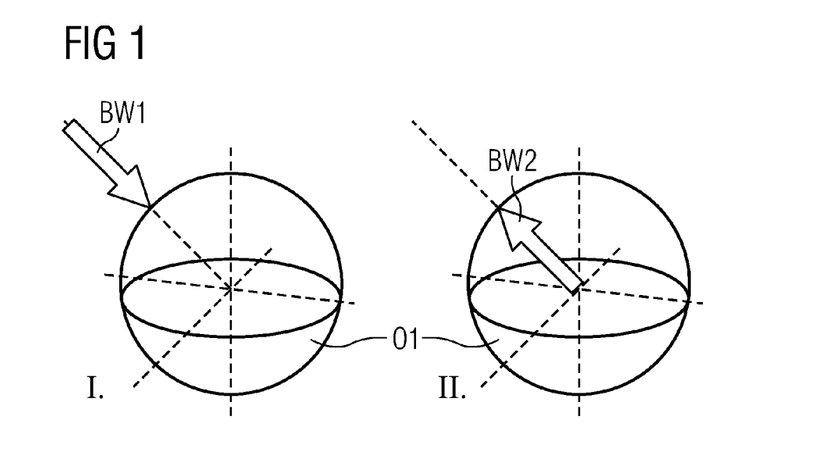
FIG. 1 a schematic diagram of the principle usage of the method according to various embodiments, wherein, in the first partial picture, the angle of view is directed at an object, and, in the second partial picture, the angle of view emanates from a fixed point in the object, FIG. 2a a first example of a control element for changing the angle of view with respect to an object, FIG. 2b a second example of a control element for changing the angle of view with respect to an object, FIG. 2c a third example of a control element for changing the angle of view with respect to an object, FIG. 2d a fourth example of a control element for changing the angle of view with respect to an object, FIG. 2e a fifth example of a control element for changing the angle of view with respect to an object, FIG. 2f a sixth example of a control element for changing the angle of view with respect to an object, FIG. 2g a seventh example of a control element for changing the angle of view with respect to an object, FIG. 3 an exemplary diagram of a point of a disk on a sphere, FIG. 4 an exemplary depiction of a transition region on a circular disk, FIG. 5 a schematic depiction showing an object, which is surrounded by a control circle, FIG. 6 exemplary depictions for limiting the possible angle of view inside the circle, FIG. 7 schematic depictions for an exemplary visualization of limitations on the control disk, FIG. 8 an exemplary depiction of the input disk as an independent control element on a screen, FIG. 9 an exemplary depiction of the input disk as an independent control element on a handheld device (e.g. Smart Phone, PDA), FIG. 10 an exemplary depiction of the input disk as an external control device, FIG. 11a a first exemplary depiction of the input disk on a touch-sensitive surface table, wherein the control circle has been placed over/around the object to be observed and FIG. 11b a second exemplary depiction of the input disk of a touch-sensitive surface table with a dedicated control element.

FIG. 1 shows a schematic diagram of the principle use of the method according to various embodiments, wherein, in the first partial picture (I), the angle of view BW1 is directed at an object O1 and in the second partial picture (II), the angle of view BW2 emanates from a fixed point in the object O1. It is hence possible to direct perspectives and directions of view at a fixed point (for example, the center point of an object O1)

(see partial picture (I)). However, it is also possible to enable an angle of view emanating from a fixed point to be viewed in a complex environment, (see partial picture (II)).

The method according to various embodiments describes the establishment of a perspective with respect to an individual object O1 (or a main object consisting of a plurality of parts) by the user (observer), wherein the angle of view BW1, BW2 can be changed continuously.

The method according to various embodiments can be used in different applications:
- displaying individual parts from (parts) catalogs
- displaying organs or body parts for more precise visual analysis, after these have been recorded by means of 3D tomography or another type of medical scanner
- displaying terrain topology observed from a certain distance, e.g. the power supply for a certain region
- observing optional individual objects isolated from the environment. This could be, for an example, an interlocutor (avatar) in a virtual world after the commencement of a selective conversation
- displaying extensive map material, which would occupy more screen than that available.

The most common method of establishing the angle of view with respect to an object is certainly direct manipulation on the actual object. For this, as a rule, a computer mouse is clicked on the object, wherein a movement in the horizontal and/or vertical direction rotates the object relative to its center point for as long as the mouse button is held. Depending upon the mouse buttons used, it is frequently also possible to move the object or zoom it in or out. The center point of the object, which, when setting the perspectives, serves as a reference point for the direction of view, is not varied.

This principle is used by virtually all common programs with 3D functionality for the observation of objects. See also FIGS. 2a to FIG. 2e.

The majority of applications to display maps also operate according to a similar principle. Here, an arbitrary point of the map is gripped and used to move the entire view. Hereby, larger distances are only possible by means of multiple regripping since the slider is restricted to the extension of the screen used.

However, due to the complexity, with three-dimensional applications, in addition to direct manipulation, frequently further abstractions of the object are additionally available. This enables the manipulation of the entire object with the aid of the abstraction, even if, with extensive magnification, only parts of the original object are to be visible, or if the object observed is momentarily located completely outside the visible region. Hereby, the abstraction is frequently reduced to the form of a cube in order to better illustrate or even label the sides of the object—left, right, front, rear, top, bottom.

In some cases, certain tilting movements, rotations and other short sequences of movement are possible by selection from a context menu, or in the form of pictograms, which are permanently displayed at the relevant points on the concrete or abstract object or as soon as the mouse cursor dwells on the relevant points of the concrete object.

It is also frequently possible to select predefined views via a (context menu). These can be defined explicitly in advance or specified by the course of the X, Y and Z axes (for example in form of "Front", "Rear", "Left", "Top", "East", "Northwest", etc.) Such predefined views are generally activated directly and do not result in a fluid transition to the new camera position from which the angle of view emanates.

Figure 2A:
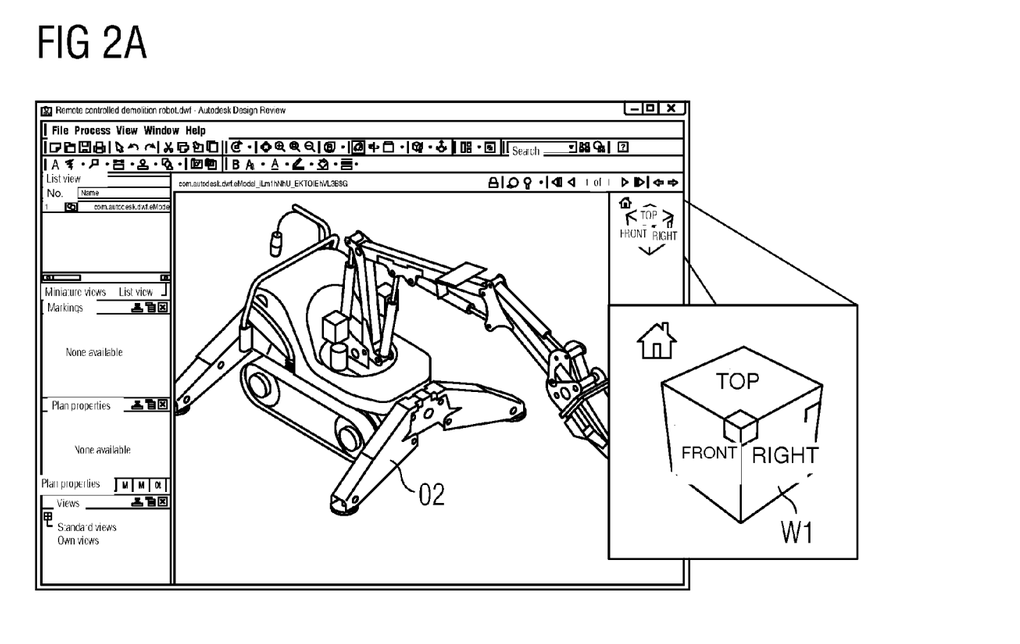

FIG. 2a shows a first example of a control element W1 for changing the angle of view with respect to an object O2. In FIG. 2a, manipulation of the object takes place (i.e. a change of the angle of view with respect to the object) with the aid of an abstraction. The abstraction is hereby reduced to the form of a cube W1. Clicking on the cube and pulling movements result in a corresponding alignment of the angle of view.

Figure 2B:
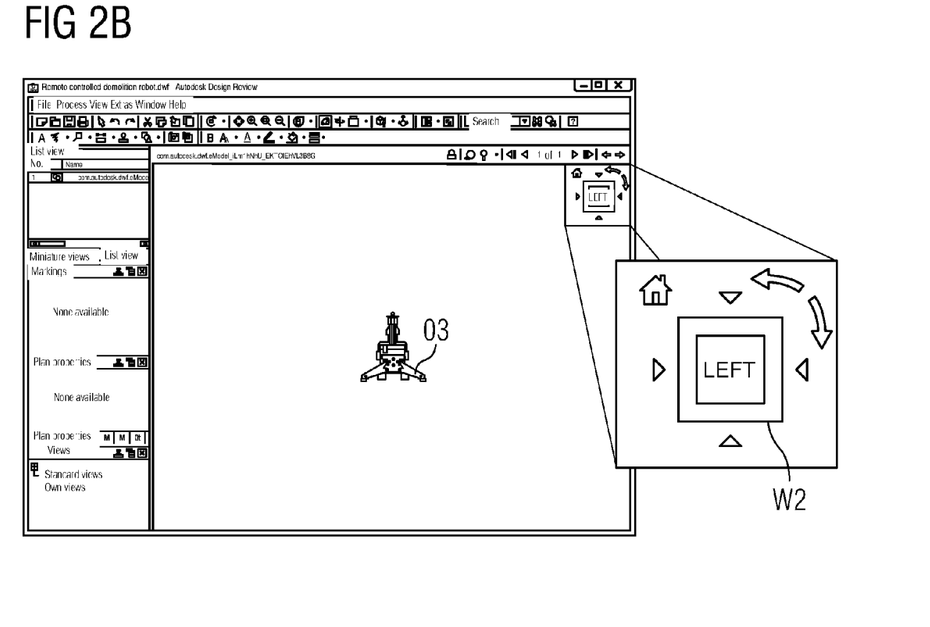

FIG. 2b shows a second example of a control element W2 for changing the angle of view with respect to an object O3. In FIG. 2b, there is also a manipulation of the object O3 (i.e. a change of the angle of view with respect to the object) with the aid of an abstraction. In FIG. 2b, the abstraction is once again reduced to the form of a cube W2. Clicking on one side of the cube results in a corresponding alignment of the angle of view with respect to the object O3.

Figure 2C:
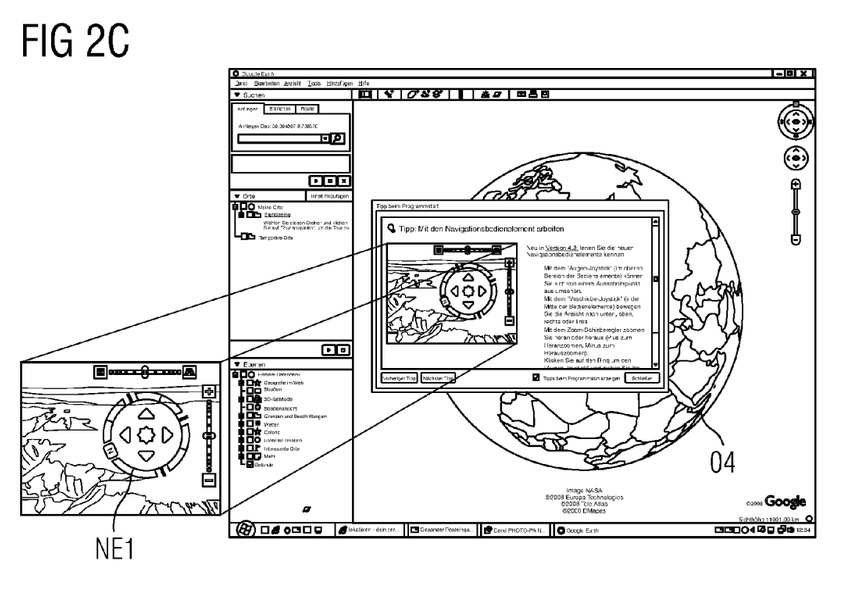

FIG. 2c shows a third example of a control element NE1 for changing the angle of view with respect to an object. The control element NE1 represents a navigation element for rotating the object O4 (rotating the object O4 also results in a change in the angle of view for an observer). The control element NE1 is usually operated by mouse input.

Figure 2D:
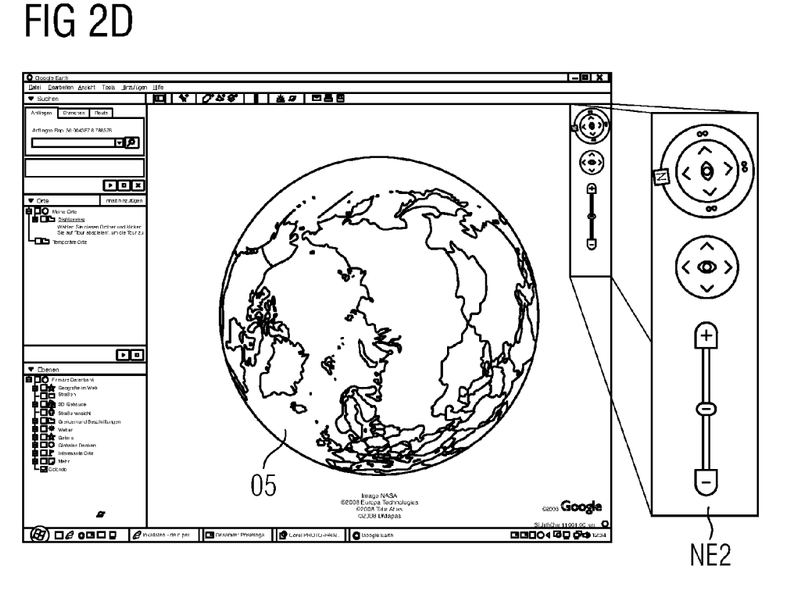

FIG. 2d shows a fourth example of a control element for changing the angle of view with respect to an object. The control element NE2 once again represents a navigation element for rotating the object O5. The control element NE2 is also usually operated by mouse input. The control element NE2 also optionally comprises input elements for zooming the object O5.

Figure 2E:
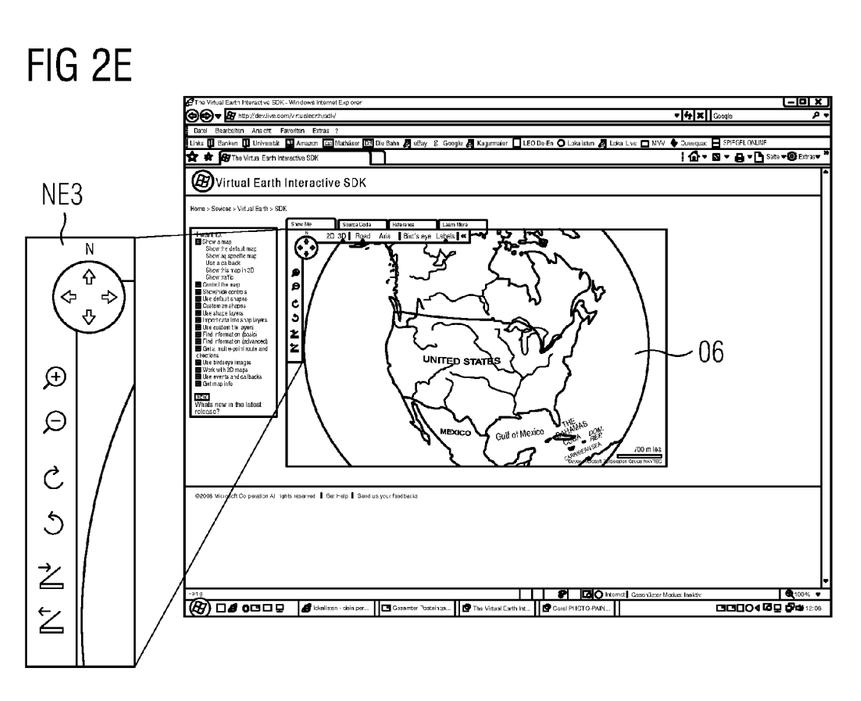

FIG. 2e shows a fifth example of a control element for changing the angle of view with respect to an object. The control element NE3 once again represents a navigation element for rotating the object O6. The control element NE3 is also usually operated by mouse input. The control element NE3 optionally also comprises input elements for zooming and for rotating or tilting the object O6.

There are also numerous possible hardware solutions, although, as a rule, these do not address the observation of objects, but implement complex navigation in 3D space with up to six degrees of freedom. Figuratively, the mouse can also be seen as a hardware solution by means of direct manipulation on the object. Unlike the control elements shown in FIG. 2a to FIG. 2e, the control elements shown in FIGS. 2f and 2g for changing the angle of view represent hardware solutions.

Figure 2F:
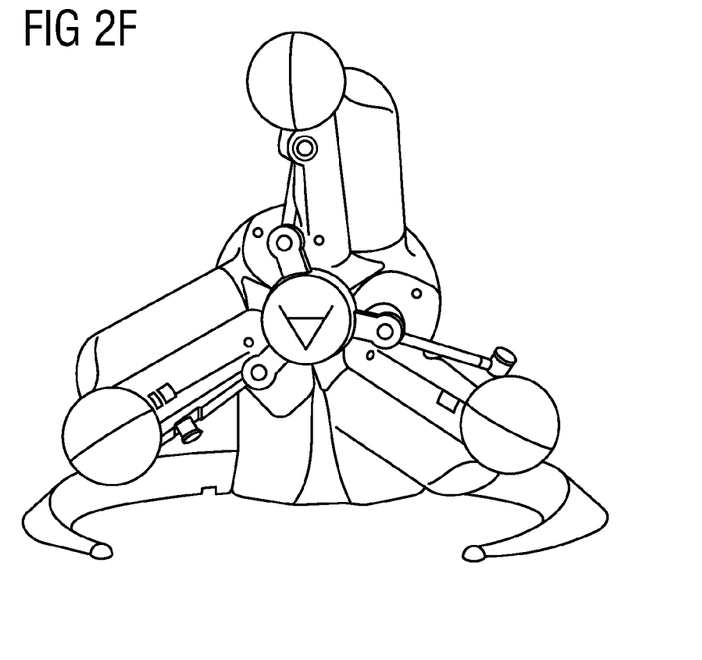

FIG. 2f shows a sixth example of a control element for changing the angle of view with respect to an object. The control element shown in FIG. 2f enables an operator to perform complex navigation in 3D space with up to six degrees of freedom, optionally combined with force feedback, in particular suitable for use with computer games.

Figure 2G:
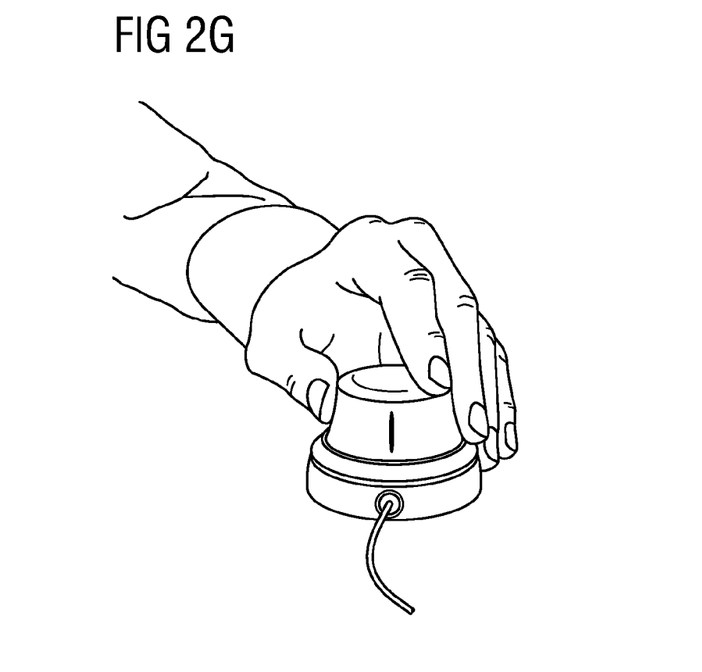

FIG. 2g shows a seventh example of a control element for changing the angle of view with respect to an object. The control element shown in FIG. 2g once again enables an operator to perform complex navigation in 3D space with up to six degrees of freedom.

Figure 3:
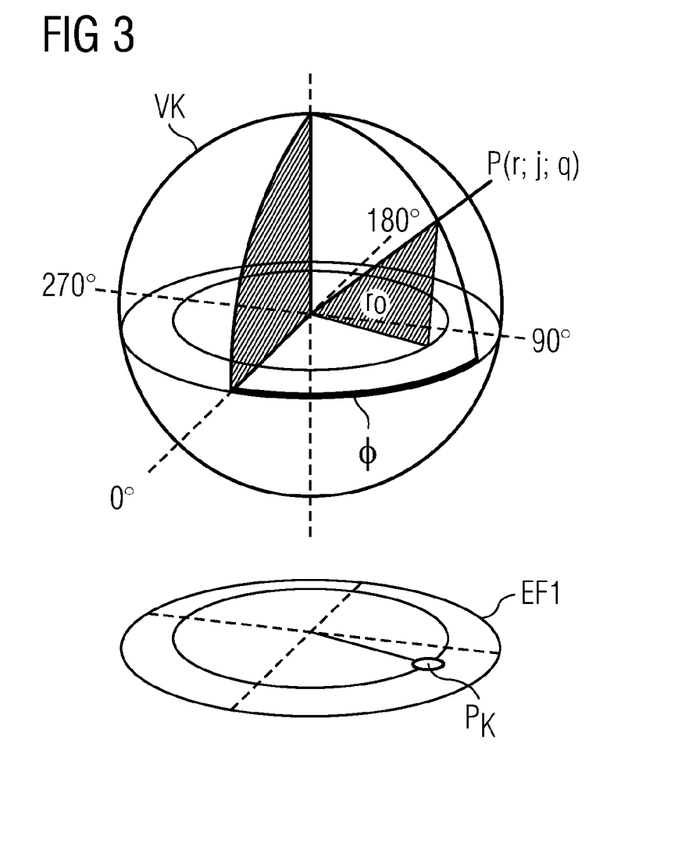

FIG. 3 shows an exemplary diagram of a point of a disk on a sphere. The method according to various embodiments enables the determination or establishment of the angle (of view) with respect to an object by control on a simple circular disk. One point on this disk is hereby converted to a position on a sphere. Connecting the position established on the sphere with that of the center of the sphere enables the angle of view with respect to the object to be calculated. Hereby, the center point of the object and the center of the sphere correspond. (Obviously, this angle can also be used to look outward from the circle center point.) In the same way, instead of a camera position and its direction of view, it is also possible for the actual object observed to be rotated. To this end, it is possible, for example, for a previously established axis of the object to be equated with the direction of view.

The circle outline and possibly the circle center point should, if possible, be indicated as an orientation aid for a user on the disk (optical or tactile).

The following explains the steps for determining the angle of view in more detail, plus the implementation of a continuous camera journey, optimizations and modification of the method.

Establishment of the Current Position on a Sphere:

The circular disk EF lies in a virtual sphere VK to which the position in 3-dimensional space is to be transmitted. The center point of the sphere is identical to the circle center point.

The current position $P_K$ is established on the circular disk EF. It is also established whether the user is currently located in front of or behind the object to be observed in 3D space. For this selected point $P_K$, the point P(r;j;q) in three-dimensional space is calculated; for this, it is possible to use all projections known per se from geography, with all their respective properties and the resulting advantages and drawbacks. Examples of this could be the cone surface projection or azimuthal projection. It is also possible for the projections to be distorted.

The exemplary (and simple) case represents the point of intersection with the sphere, wherein the user proceeds vertically from the point of origin PK of the two-dimensional disk to the edge of the sphere. If the center of the sphere is assumed to be point zero (0,0,0), the values for the X and Y dimensions can be taken over directly from the circular disk. The Z value is obtained as sin(cos(d)), wherein d is the distance of the point to the center point on the two-dimensional disk. Hereby, the value for d has to be standardized (that is lie between 0 and 1). The Z value has to be transformed by the corresponding factor.

If the user is currently on the rear side, the Z value (here, the height) is prefixed by a minus sign.

The distance from the camera to the object (center point) corresponds to the radius of the sphere and can (depending on the any zoom level selected) be optionally selected. In order to permit variations of the distance, it is advisable, when converting from circle to sphere, to use a factor for scaling but to leave the initial circle radius unchanged.

The direction of view of the camera (corresponds to the angle of view) is always directed at the object (or to be more precise, at its center point, which, here, coincides with the circle center point) and can hence be calculated in the following simple way:

LookDirection=Vector3D(objectPosition.X−camPosition.X, objectPosition.Y−camPosition.Y, objectPosition.Z−camPosition.Z)

Figure 4:
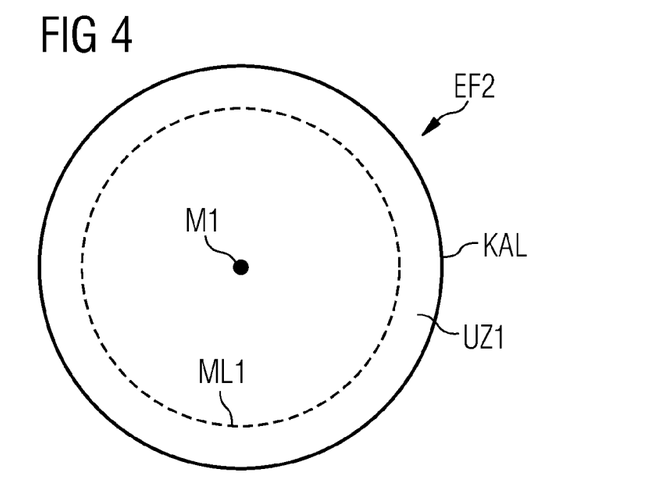

If the object is located in accordance with the simplified assumption at the point of origin (0,0,0), simple negation of the camera coordinates is sufficient. In the event that the user wishes to look from the position of the sphere center point, the object and camera position are transposed and addition is used instead of subtraction. FIG. 4 shows an exemplary depiction of a transition region UZ1 on a circular disk EF2, which is in particular suitable for a continuous movement of the angle of view or for a continuous rotation of an object. In FIG. 4, the transition region UZ1 is shown on a circular disk EF2 between the circle outline KAL and a dotted marking line ML1. Advantageously, the center point M1 of the circular disk EF2 and the transition region UZ1 is identified in color or tactile form (e.g. by grooves, elevations or roughening). Hence, a user is able to orientate himself without his having to look away from the screen.

Instead of a single touch of the two-dimensional disk EF2, the position can be varied constantly by continuously moving an input device or a finger. Hereby, the elementary part is the change between the previously defined front and rear side of the object. The following variants are conceivable for the establishment of the front and rear side of the object to be observed on the (repeat) touching of the circle:

The object has a firmly defined front and rear side; when the control element is touched, the side most recently viewed (which was active on the last "release") is revisited. However, this requires a short flight of the camera to ensure a fluid change of the camera angle to the new start position. The angle of view could also change abruptly to the new position and only be continuously varied during the contact.

The object has a firmly defined front and rear side; a fixed point (for example, a small marked area in the middle, which, during a camera journey has no further significance) is used to change between the two sides. Hereby, it is optionally possible to revisit the side most recently viewed. Once again, a fluid change of the camera angle to the new initial position is only possible by a short flight of the camera The front side is always defined by the last angle of view. When the control element is touched, the starting point is automatically equated with the current camera angle. This variant permits fluid navigation on the sphere, including on the resumption and start of a camera journey.

The change between the two sides optionally takes place after "entering" the so-called transition region UZ1. As long as, viewed from the circle center point M1, the user moves further outward, the camera is continually repositioned according to the above calculation. If, however, the user now moves backward inside the transition region UZ1, there is an automatic change from the front side to the rear side or vice versa. If possible, it is recommended that the circular input field EF2 be colored differently depending upon the side.

As a general rule: the larger the circle and/or its resolution capability relative to of the input device (for example, including a finger), the smaller this zone can be selected.

Since, for a fluid change from the front side to the rear side, it is necessary to follow the turning movement exactly on the edge of the circle KAL, the following section discusses a few possibilities for optimization, which guarantee an uninterrupted change of this kind inside the whole transition region UZ1 without the camera jumping directly to the new position.

Instead of rotating the camera position (for the determination of the angle of view), it is also possible to rotate the observed object. This permits a continuously constant perspective with respect to the object, with a constant direction of view; otherwise, depending on the camera journey, the perspective would stand on its head in places.

Optimization for Fluid Side Change:

There are various possible approaches as optimization strategies for a fluid change between the front and rear side in a previously defined transition region, wherein the following only highlights a few by way of example:

A correction vector is generated at exactly the point of reversal inside the transition region UZ1.

Therefore, the front and rear sides are no longer separated by the original area (see the position of the control disk EF2 in 3-dimensional space); instead, at this time, the calculated angle of view and the corrected separating disk are located on the same plane, in that the separating disk is displaced by the correction vector. Any visual aspects of the control disk EF2 have to be adapted directly to the new position of the separating disk between the front and rear sides.

The setting of the angle of view is always performed with less than 0.5 seconds delay to the actual positioning by the user. Due to its brevity, the time delay is scarcely perceptible, but, nevertheless, the optimization should only be combined with a relatively narrow transition region. On the change of the front and rear side, the camera is accelerated on the shortest route between the old position of the front side and new position on the rear side (or vice versa) until the delay once again corresponds to the original time distance. The delay can also only occur on the change in the transition region and made good as soon as possible (with a not too excessively contrasting acceleration) by the accelerated camera journey.

As mentioned in the introduction, different projections can be used for the conversion between the circular disk and the sphere. A projection which is true-to-line relative to distances on the sphere and the circle enables the transition region to be selected narrower and the jump to be minimized.

Figure 5:
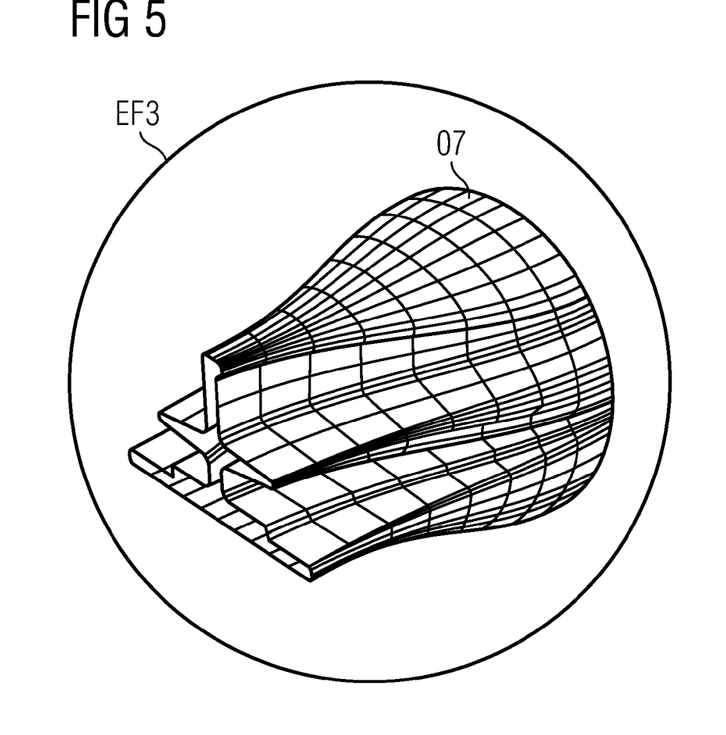

FIG. 5 shows a schematic depiction of an object O7, which is surrounded by a control circle EF3. Instead of control by an additional control element, the object O7 itself can be moved "true-to-scale"; i.e. in order to generate a complete camera journey around the object, the object has to be traversed in full once (corresponding to a distance of twice the diameter). The zone for the side change should be indicated hereby, for example by showing a circle EF3 around the object O7.

If the camera journey can only be commenced inside the indicated edge zone, this has the advantage that the object itself remains available for other actions, for example the selection of components or comments on these, etc.

Figure 6:
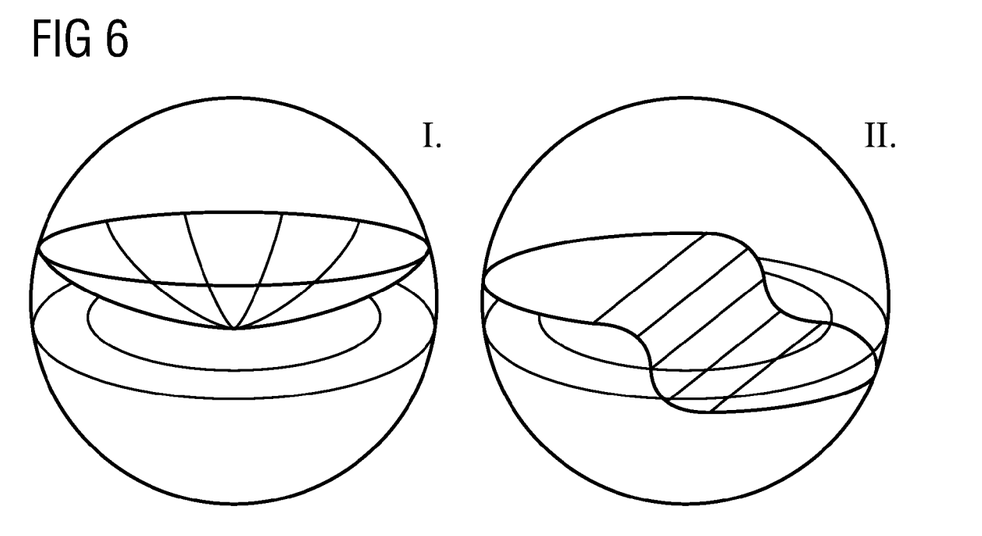

FIG. 6 shows exemplary depictions for the limitation of the possible angle of view inside the circle. In principle, it is also only possible to select sections of a sphere. These can be simple sections of the sphere with surface areas as shown in the left part I of FIG. 6. However, more complex, mathematically calculable structures are also possible, as shown in the right part II of FIG. 6. This permits the restriction of the available angle of view with respect to the object, for example only the front side of an object, or as in part I only a view from the top with a certain minimum height.

Figure 7:
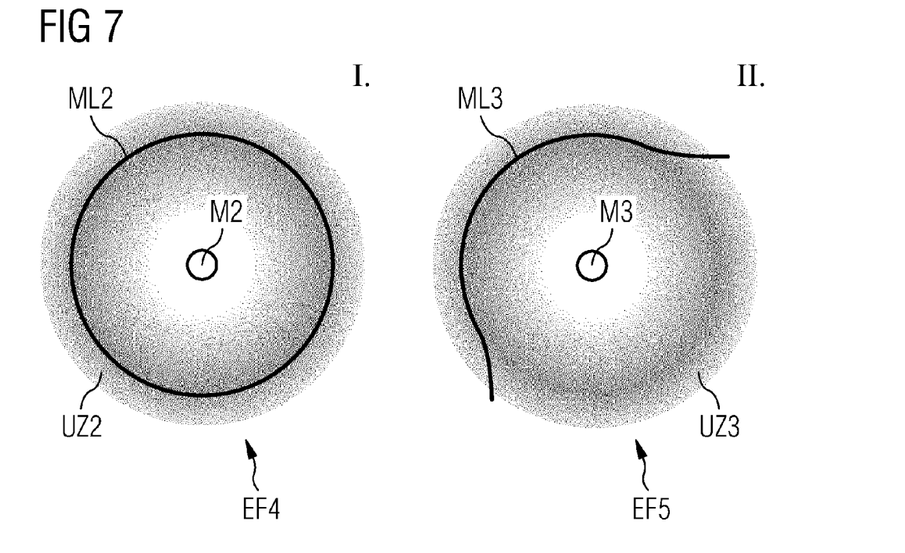

FIG. 7 shows schematic depictions for an exemplary visualization of limitations ML2, ML3 on the control disk EF4 or EF5. Parts I and II of FIG. 7 each show a circular input field EF4 and EF5 with the dark grey transition regions UZ2 or UZ3 and with the center points M2 or M3. In addition, the marking lines ML2 and ML3 represent limits set for a camera journey (e.g. in order to observe an object from different angles of view). A camera journey performed has to pause here at the last valid position. If the zone UZ2, UZ3 is in the region blocked for a side change, no side change takes place.

Advantages and advantageous embodiments of the method presented are in particular:

Fluid, continuous changes of the angle of view with respect to an object are possible without any restriction from the edge of screen, for example.

It can be achieved both purely by software means (e.g. for Object Viewer) and by hardware means. The method presented can, for example, be integrated without protruding parts in panels next to other operating elements and is therefore simple to clean. This is a basic precondition for hospitals and other sterile environments. One possible implementation with capacitive touch-sensitive elements is conceivable.

Since the object observed cannot itself be used to control the movement, further functions (marking, commenting and any other actions) can be used on the object observed.

The entire area of the object displayed is not required for the input. Even a small region is sufficient for the theoretically infinite variation of the angle of view.

In addition to the object view in 3D space and the moving of areas, in principle any further control option which may be depicted on movements on a sphere is conceivable. This could be the swinging of a device/vehicle or also the control of mobile entities with the speed being indicated by the number of revolutions completed.

Figure 8:
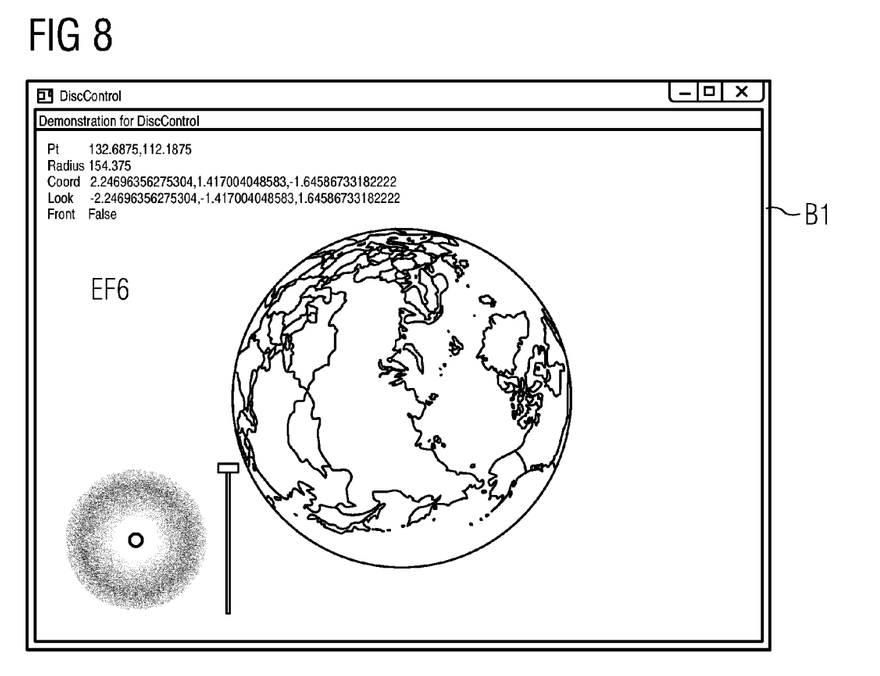

FIG. 8 shows an exemplary depiction of the input disk EF6 as an independent control element on a screen or on a screen window B1.

The exemplary embodiment in FIG. 8 represents a prototype implementation of the input field EF6 and was implemented with Windows Presentation Foundation (WPF™). The input field EF8 at the left bottom enables the globe to be observed from any position. The optional bar on the right next to the input field EF6 is used for zooming. In addition, it is also possible to implement the zoom function is a variety of ways, for example in the case of a software-based input element, as in this exemplary embodiment in FIG. 8, by a mouse wheel on a cursor-generating device on a computer.

Figure 9:
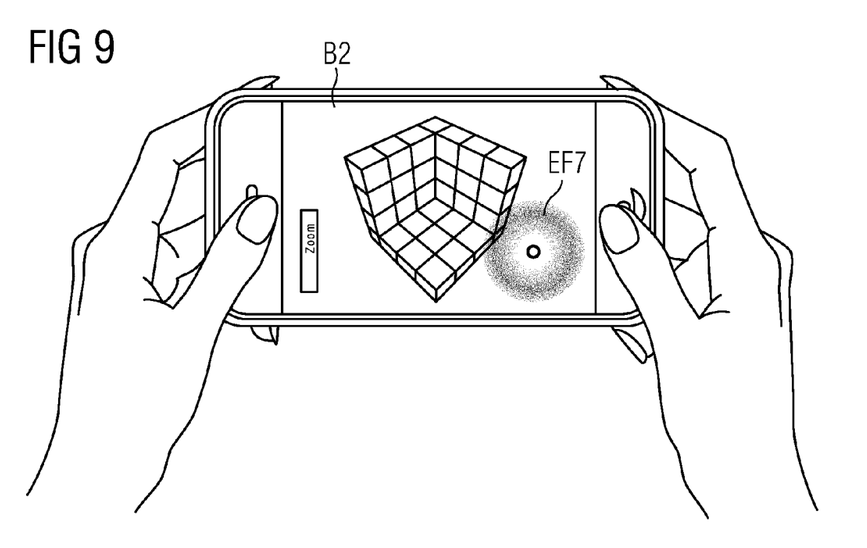

FIG. 9 shows an exemplary depiction of the input field EF7 as an independent control element on a display (monitor) B2 of a handheld device (e.g. Palmtop, PDA or Smart Phone). Advantageously, the handheld device can be touch-sensitive. The observed object, here a structure made up of cubes, can be seen in the centre of FIG. 9. At the bottom right, there is the input field EF7 for selecting and varying the angle of view. A possible option is an input element for zooming the object.

If the input device is able to process a plurality of touch points at the same time (multi-touch ability), zooming and variation of the angle of view can be performed simultaneously. In the case of devices with multi-touch ability, advantageously the input element for zooming and the input field EF7 for varying the angle of view can be operated simultaneously by one hand each.

Figure 10:
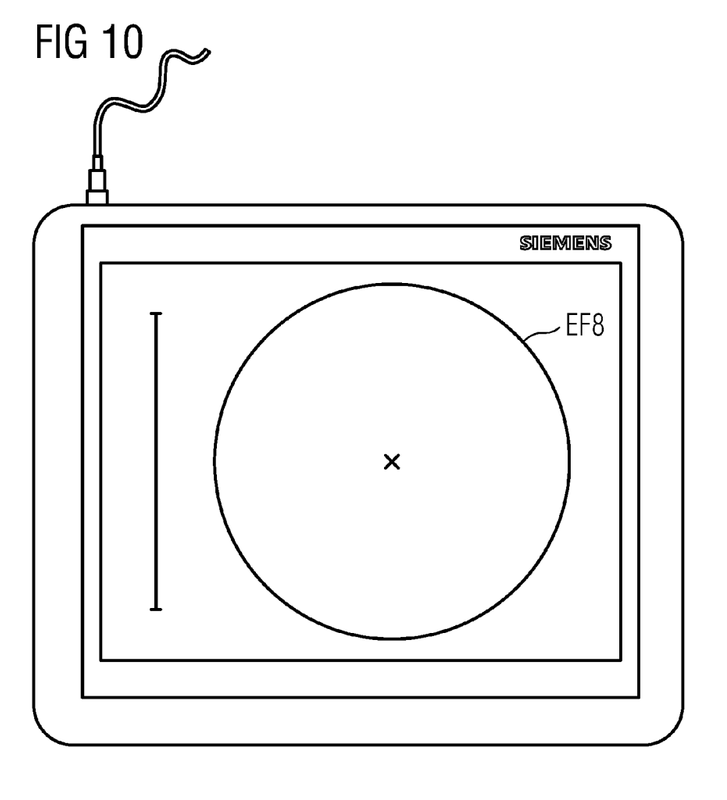

FIG. 10 shows an exemplary depiction of the input disk EF8 as an external control device or integrated in an external control device, which may be connected to a computer or output device (e.g. a monitor). The input device shown in FIG. 10 for operation by a stylus and/or finger could comprise both conventional touchpad functions and, in the sense of an expansion, the functions for changing the angle of view by the input field EF8. A change between the conventional cursor and the control of an angle of view could be facilitated both by means of software and by means of a button/switch on the actual input device or an associated input stylus.

Figure 11A:
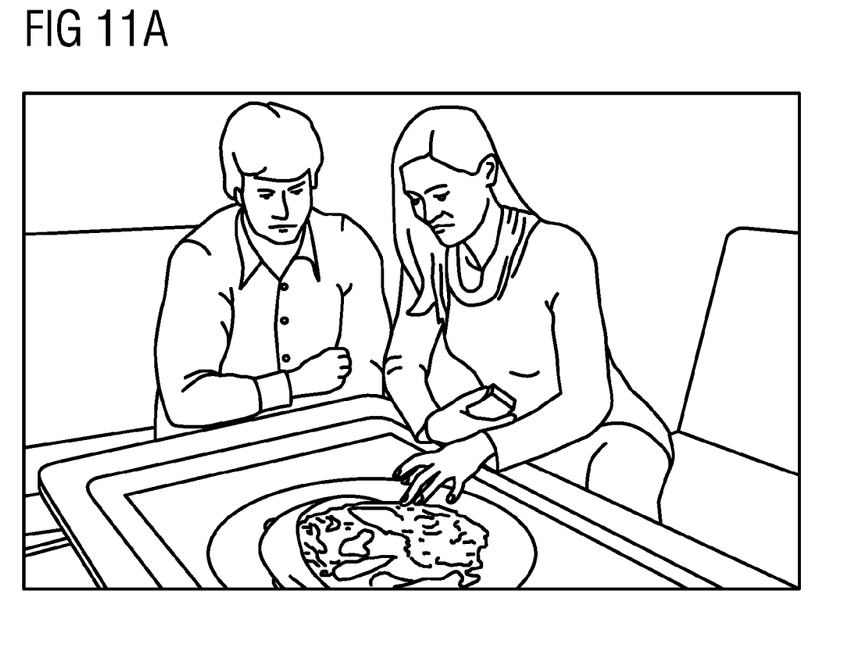

FIG. 11a shows a first exemplary depiction of the input field on a Surface™ table (touch-sensitive surface table). In FIG. 11a, the input field is arranged as a control circle over the object.

Figure 11B:
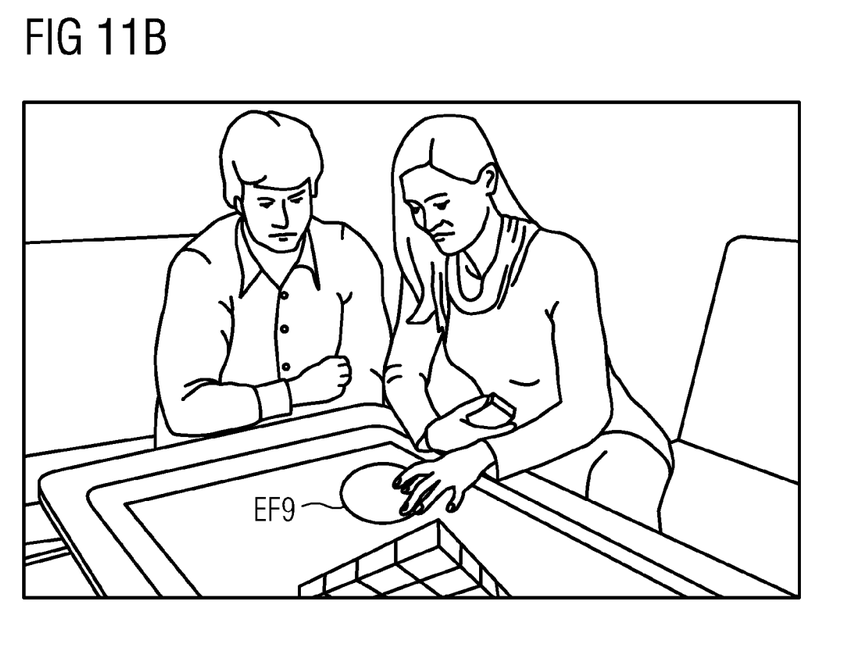

FIG. 11b shows a second exemplary depiction of the input field EF9 on a Surface™ table (touch-sensitive surface table). In FIG. 11b, the input field EF9 is arranged as an input disk (additional control element) on the surface table.

In the examples shown, the starting point on the circular input field for conversion to an angle of view is in each case specified by a mouse cursor, finger or any other operating element (stylus, etc.).

The input field itself can hereby be implemented purely by software for existing systems, but also separately in the form of hardware.

A method and operating element for establishing an angle of view for an observer with respect to a two or three-dimensional object, which is displayed on an output device, wherein the establishment of the angle of view takes place by control on a simple circular disk. A point on said disk is converted to a position on a virtual sphere. The respective angle of view with respect to the object is established by the axis, determined by the calculated position on the virtual sphere and the sphere center.

REFERENCE CHARACTERS

O1-O7 Object
BW1, BW2 Angle of view
W1, W2 Cube
NE1-NE3 Navigation element
EF1-EF9 Input field
VK Virtual sphere
UZ1-UZ3 Transition region
KAL Circle outline
ML1-ML3 Marking line
M1-M3 Center point
B1-B2 Screen

What is claimed is:

1. A method for establishing an angle of view for an observer with respect to an object to be displayed the method comprising the following steps:
receiving mechanical-tactile or indirect input from the observer via a circular, substantially level, input field associated with a physical input device, the mechanical-tactile or indirect input defining movements within a first defined region of the circular input field,
dynamically establishing an angle of view of a front side of the object based on the received mechanical-tactile or indirect input by:
converting a point of the circular input field within the first defined region, defined by the input from the observer, to a positioning point on a front part of a virtual sphere,
wherein a center point of the virtual sphere and a center point of the object to be displayed substantially correspond,
defining a connecting line from the center point of the virtual sphere to the positioning point on the virtual sphere that establishes the angle of view for the observer,
displaying the front part of the object on an output mechanism according to the established angle of view,
continuously detecting the mechanical-tactile or indirect input defining movements within the first defined region of the circular input field, automatically updating the established angle of view of the front part of the object, and automatically updating the display of the front part of the object according to the automatically updated angle of view,
detecting a movement from the first defined region of the circular input field into a transition region of the of the circular input field located around an edge of a circle defined by the circular input field, the transition movement causing an automatic transition from displaying the front part of the object to displaying a rear part of the object opposite the front part of the object,
detecting a movement from the transition region of the circular input field back into the first defined region of the of the circular input field, and
after detecting the movement back into the first defined region of the of the circular input field, dynamically establishing an angle of view of the rear part of the object and automatically updating the display of the rear part of the object based on the received mechanical-tactile or indirect input defining movements within the first defined region of the circular input field.

2. The method according to claim 1, wherein a circle outline is applied to the input field.

3. The method according to claim 1, wherein a circle center point is applied to the input field.

4. The method according to claim 1, wherein the transition region is applied in color or tactile form to the input field.

5. The method according to claim 1, wherein the conversion of a position on the input field is performed on the positioning point of the virtual sphere by cone surface projection or azimuthal projection.

6. The method according to claim 1, wherein the circular input field surrounds the actual object or lies between the observer and object.

7. The method according to claim 1, wherein the angle of view is restricted to sections of the object.

8. The method according to claim 1, wherein the input field is convex or concave.

9. The method according to claim 1, wherein at least one of a direction of view and a starting point of the observer is movable by a fixed relative value.

10. A method for aligning an object by establishing its position in a three-dimensional space, the method comprising the following steps:
a) establishment of an axis of the object; and
b) establishment of the position by mechanical-tactile or indirect input via interaction of an observer with a circular, substantially level, input field associated with a physical input device by:
converting a point of the circular input field defined by the input from the observer to a positioning point on a virtual sphere defining three orthogonal axes,
wherein a center point of the virtual sphere and a center point of the object to be displayed substantially correspond,
converting the object according to the established axis such that a line connecting the center point of the virtual sphere to the positioning point on the virtual sphere corresponds with the established axis,
continuously detecting the mechanical-tactile or indirect input via interactions of the observer with the circular, substantially level input field,
automatically adjusting the angle of view for the observer around all three orthogonal axes in response to the continuously detected mechanical-tactile or indirect input via the interactions of the observer with the circular, substantially level input field,
during the continuous detection of the mechanical-tactile or indirect input from the input field, detecting an entry into a transition region of the input field located around an edge of a circle defined by the circular input field, and
in response to detecting an entry into the transition region, automatically migrating the positioning point to a rear part of the virtual sphere.

11. The method according to claim 10 further comprising:
c) displaying the object relative to the view resulting from a change of location.

12. The method according to claim 10, wherein the object is a physical object, further comprising:
d) rotating the object relative to the calculated change of location.

13. The method according to claim 10, wherein a circle outline is applied to the input field.

14. The method according to claim 10, wherein a circle center point is applied to the input field.

15. The method according to claim 10, wherein the transition region is applied in color or tactile form on the input field.

16. The method according to claim 10, wherein the input field is convex or concave.

17. A method for moving a view of an object, comprising:
  detecting mechanical-tactile or indirect input from an observer via a circular, substantially level, input field associated with a physical input device, the detected input defining movements within a first defined region of the circular input field,
  dynamically adjusting an angle of view of a front side of the object by:
    converting a point of the circular input field defined by the input from the observer to a positioning point on a virtual sphere,
    establishing the angle of view of the front side of the object based on the positioning point of the virtual plane,
    continuously detecting the mechanical-tactile or indirect input from the circular input field, and dynamically adjusting the established angle of view of the front side of the object based on the continuously detected input,
  detecting a movement from the first defined region of the circular input field into a transition region of the circular input field located around an edge of a circle defined by the circular input field, the transition movement causing an automatic transition from displaying the front side of the object to displaying a rear side of the object opposite the front side of the object,
  detecting a movement from the transition region of the circular input field back into the first defined region of the of the circular input field, and
  after detecting the movement back into the first defined region of the of the circular input field, dynamically adjusting an angle of view of the rear side of the object based on received mechanical-tactile or indirect input defining movements within the first defined region of the circular input field.

18. The method according to claim 17, wherein the view corresponds to a map or another two-dimensional area.

19. The method according to claim 17, wherein the view corresponds to the position of a camera in a plane.

20. The method according to claim 17, wherein a circle outline is applied to the input field.

21. The method according to claim 17, wherein a circle center point is applied to the input field.

22. The method according to claim 17, wherein the transition region is applied in color or tactile form on the input field.

23. The method according to claim 17, wherein the input field is convex or concave.

* * * * *